(12) United States Patent
Utsunomiya et al.

(10) Patent No.: US 12,386,214 B2
(45) Date of Patent: Aug. 12, 2025

(54) OPTICAL MODULATOR AND DRIVING METHOD OF OPTICAL MODULATION ELEMENT

(71) Applicant: TDK CORPORATION, Tokyo (JP)

(72) Inventors: Hajime Utsunomiya, Tokyo (JP); Takashi Kikukawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 220 days.

(21) Appl. No.: 17/928,386

(22) PCT Filed: Jun. 18, 2021

(86) PCT No.: PCT/JP2021/023145
§ 371 (c)(1),
(2) Date: Nov. 29, 2022

(87) PCT Pub. No.: WO2022/034742
PCT Pub. Date: Feb. 17, 2022

(65) Prior Publication Data
US 2023/0213791 A1 Jul. 6, 2023

(30) Foreign Application Priority Data
Aug. 11, 2020 (JP) ................................ 2020-135861

(51) Int. Cl.
*G02F 1/035* (2006.01)
*G02F 1/01* (2006.01)

(52) U.S. Cl.
CPC ............ *G02F 1/035* (2013.01); *G02F 1/0123* (2013.01)

(58) Field of Classification Search
CPC ................. G02F 1/0123; G02F 1/035
See application file for complete search history.

(56) References Cited

U.S. PATENT DOCUMENTS 6,334,004 B1 12/2001 Ohkuma et al.
8,849,071 B2 * 9/2014 Kissa ...................... G02F 1/225
385/50
(Continued)

FOREIGN PATENT DOCUMENTS

JP H09-211400 A 8/1997
JP 2000-180804 A 6/2000
(Continued)

OTHER PUBLICATIONS

Sep. 7, 2021 International Search Report issued in Patent Application No. PCT/JP2021/023145.
(Continued)

*Primary Examiner* — Rhonda S Peace
(74) *Attorney, Agent, or Firm* — Oliff PLC

(57) ABSTRACT

The optical modulator includes an optical modulation element having a first optical waveguide, a second optical waveguide, a first electrode which applies an electric field to the first optical waveguide, and a second electrode which applies an electric field to the second optical waveguide, and a control unit configured to control an applied voltage between the first electrode and the second electrode. When a half-wave voltage of the optical modulation element is Vπ and a null point voltage of the optical modulation element is Vn, the control unit sets an operating point Vd in a range of Vn+0.50Vπ≤Vd≤Vn+0.75Vπ or Vn−0.75Vπ≤Vd≤Vn−0.50Vπ and sets an applied voltage width Vpp, which is an amplitude of an applied voltage applied to the optical modulation element, in a range of 0.22Vπ≤Vpp≤0.50Vπ.

4 Claims, 5 Drawing Sheets

(56) References Cited

U.S. PATENT DOCUMENTS

| | | | |
|---|---|---|---|
| 10,243,667 B2* | 3/2019 | Iwata | H04B 10/50575 |
| 12,242,143 B2* | 3/2025 | Yoshida | G02F 1/035 |
| 12,248,205 B2* | 3/2025 | Utsunomiya | G02F 1/0316 |
| 2002/0146190 A1* | 10/2002 | Doi | G02F 1/2255 |
| | | | 385/40 |
| 2015/0138619 A1 | 5/2015 | Iwatsuka et al. | |
| 2018/0294888 A1 | 10/2018 | Iwata et al. | |
| 2022/0276513 A1* | 9/2022 | Utsunomiya | G02F 1/212 |
| 2023/0213791 A1* | 7/2023 | Utsunomiya | G02F 1/2255 |
| | | | 385/2 |
| 2023/0229030 A1* | 7/2023 | Utsunomiya | G02F 1/035 |
| | | | 385/2 |

FOREIGN PATENT DOCUMENTS

| | | | |
|---|---|---|---|
| JP | 2004-037695 A | 2/2004 | |
| JP | 4164179 B2 | 10/2008 | |
| JP | 2015-102686 A | 6/2015 | |
| JP | 2018-182465 A | 11/2018 | |
| JP | 2019-045880 A | 3/2019 | |

OTHER PUBLICATIONS

Translation of Jun. 6, 2023 Office Action issued in Japanese Patent Application No. 2020-135861.
Translation of Jan. 4, 2023 Office Action issued in Japanese Patent Application No. 2020-135861.

* cited by examiner

OPTICAL MODULATOR AND DRIVING METHOD OF OPTICAL MODULATION ELEMENT

TECHNICAL FIELD

The present disclosure relates to an optical modulator and a driving method of an optical modulation element.

Priority is claimed on Japanese Patent Application No. 2020-135861, filed Aug. 11, 2020, the content of which is incorporated herein by reference.

BACKGROUND ART

With spread of the Internet, the amount of communication traffic thereon has increased dramatically, and the importance of optical fiber communication has increased significantly. Optical fiber communication transmits an optical signal by optical fiber by converting an electrical signal into an optical signal, and has features of having a wide band, a low loss, and resistance to noise.

An optical modulator converts an electrical signal into an optical signal. For example, Patent Document 1 and 2 describe a Mach-Zehnder type optical modulator in which an optical waveguide is formed by Ti (titanium) diffusion in the vicinity of a surface of a lithium niobate single crystal substrate. Also, Patent Document 2 describes that a drift of an operating point of the optical modulator is corrected. The optical modulators described in Patent Document 1 and 2 operate at a high speed of 40 Gb/s or more, but have a long total length of about 10 cm.

In contrast, Patent Document 3 describes a Mach-Zehnder type optical modulator using a c-axis-oriented lithium niobate film. The optical modulator using a lithium niobate film is smaller in size and has a lower drive voltage compared to an optical modulator using a lithium niobate single crystal substrate.

CITATION LIST

Patent Document

[Patent Document 1]
Japanese Unexamined Patent Application, First Publication No. 2004-37695
[Patent Document 2]
Japanese Patent No. 4164179
[Patent Document 3]
Japanese Unexamined Patent Application, First Publication No. 2019-45880

SUMMARY OF INVENTION

Technical Problem

Since an optical modulator using lithium niobate have a large extinction ratio and can operate in a high-frequency band, the optical modulator is used for long-distance communication such as between cities. Also, since an optical modulator using indium phosphide (InP) can also operate in a high-frequency band, this optical modulator is expected to be used for long-distance communication. On the other hand, in recent years, short-distance and medium-distance communication within and between data centers also have increased, and in such applications, there are cases in which an optical modulator using silicon is used and cases in which emitted light is directly modulated by a drive circuit of a laser diode without using an optical modulator. Modulation by an optical modulator using silicon or direct modulation cannot support frequencies becoming even higher.

On the other hand, in order to apply an optical modulator that can operate in a high-frequency band, such as an optical modulator using a lithium niobate thin film or an optical modulator using indium phosphide, to communication within or between data centers, a drive voltage is required to be lowered.

The present disclosure has been made in view of the above-described problems and an objective thereof is to provide an optical modulator that can be driven at a low voltage and furthermore has little modulation loss, and a driving method of an optical modulation element that can be driven at a low voltage and in which a modulation loss can be reduced to a low level.

Solution to Problem (1) An optical modulator according to a first aspect includes an optical modulation element having a first optical waveguide, a second optical waveguide, a first electrode which applies an electric field to the first optical waveguide, and a second electrode which applies an electric field to the second optical waveguide, and a control unit configured to control an applied voltage between the first electrode and the second electrode, in which when a half-wave voltage of the optical modulation element is $V\pi$ and a null point voltage of the optical modulation element is $Vn$, the control unit sets an operating point $Vd$ in a range of $Vn+0.50V\pi \leq Vd \leq Vn+0.75V\pi$ or $Vn-0.75V\pi \leq Vd \leq Vn-0.50V\pi$ and sets an applied voltage width $Vpp$, which is an amplitude of an applied voltage applied to the optical modulation element, in a range of $0.22V\pi \leq Vpp \leq 0.50V\pi$.

(2) In the optical modulator according to the above-describe aspect, the first optical waveguide and the second optical waveguide may each include a ridge-shaped portion protruding from a first surface of a lithium niobate film.

(3) A driving method of an optical modulation element according to a second aspect is a driving method of an optical modulation element including a first optical waveguide, a second optical waveguide, a first electrode which is at a position overlapping the first optical waveguide in a plan view, and a second electrode which is at a position overlapping the second optical waveguide in a plan view, the driving method includes setting an operating point $Vd$ in a range of $Vn+0.50V\pi \leq Vd \leq Vn+0.75V\pi$ or $Vn-0.75V\pi \leq Vd \leq Vn-0.50V\pi$, when a half-wave voltage of the optical modulation element is $V\pi$ and a null point voltage of the optical modulation element is $Vn$; and setting an applied voltage width $Vpp$, which is an amplitude of an applied voltage applied to the optical modulation element, in a range of $0.22V\pi \leq Vpp \leq 0.50V\pi$.

(4) In the driving method of an optical modulation element according to the above-describe aspect, the first optical waveguide and the second optical waveguide may each include a ridge-shaped portion protruding from a first surface of a lithium niobate film.

Advantageous Effects of Invention

The optical modulator and the driving method of an optical modulation element according to the above-described aspects provide an optical modulator that can be driven at a low voltage and has little modulation loss.

DESCRIPTION OF EMBODIMENTS

Figure 1:
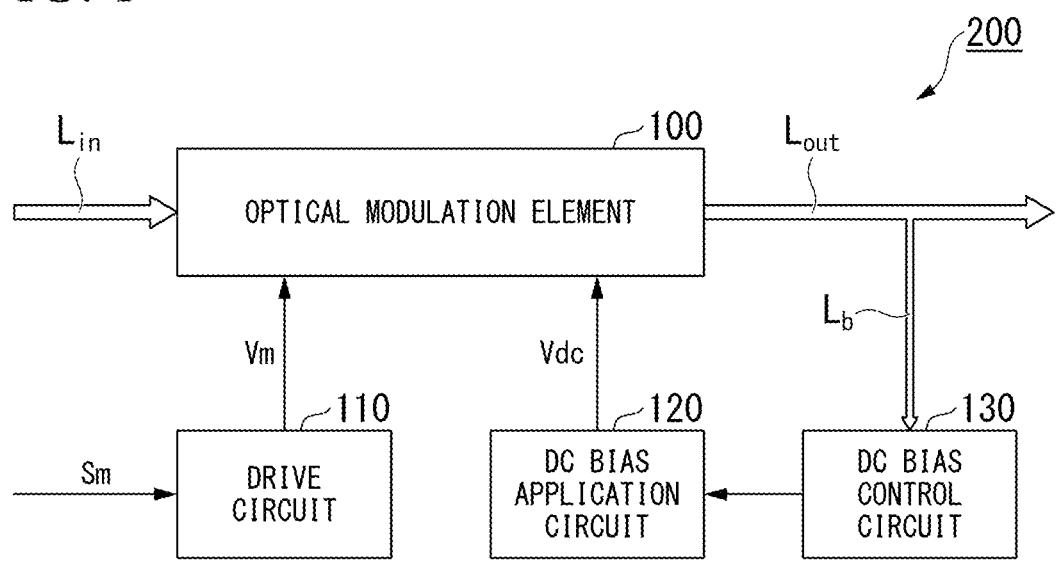
FIG. 1 is a block diagram of an optical modulator according to a first embodiment.

Hereinafter, the present embodiment will be described in detail with reference to the drawings as appropriate. In the drawings used in the following description, there are cases in which characteristic portions are enlarged for convenience of illustration so that characteristics can be easily understood, and dimensional proportions or the like of respective constituent elements may be different from actual ones. Materials, dimensions, and the like illustrated in the following description are merely examples, and the present disclosure is not limited thereto and can be implemented with appropriate modifications within a range in which the effects of the present disclosure are achieved.

First, directions will be defined. One direction of one surface of a substrate Sb is defined as an x direction, and a direction perpendicular to the x direction is defined as a y direction. The x direction is, for example, a direction in which a first optical waveguide 11 extends. A z direction is a direction perpendicular to the substrate Sb. The z direction is a direction perpendicular to the x direction and the y direction. Hereinafter, the positive z direction may be expressed as "upward" and the negative z direction may be expressed as "downward." "Upward" and "downward" do not necessarily have to coincide with a direction in which gravity is applied.

FIG. 1 is a block diagram of an optical modulator 200 according to a first embodiment. The optical modulator 200 includes an optical modulation element 100, a drive circuit 110, a direct current (DC) bias application circuit 120, and a DC bias control circuit 130. The drive circuit 110, the DC bias application circuit 120, and the DC bias control circuit 130 form a control unit.

The optical modulation element 100 converts an electrical signal into an optical signal. The optical modulation element 100 converts input light $L_{in}$ that has been input into an output light $L_{out}$ according to a modulation signal Sm.

The drive circuit 110 applies a modulation voltage Vm according to the modulation signal Sm to the optical modulation element 100. The DC bias application circuit 120 applies a DC bias voltage Vdc to the optical modulation element 100. The DC bias control circuit 130 monitors the output light $L_{out}$ and controls the DC bias voltage Vdc output from the DC bias application circuit 120. When the DC bias voltage Vdc is adjusted, an operating point Vd to be described later is controlled.

Figure 2:
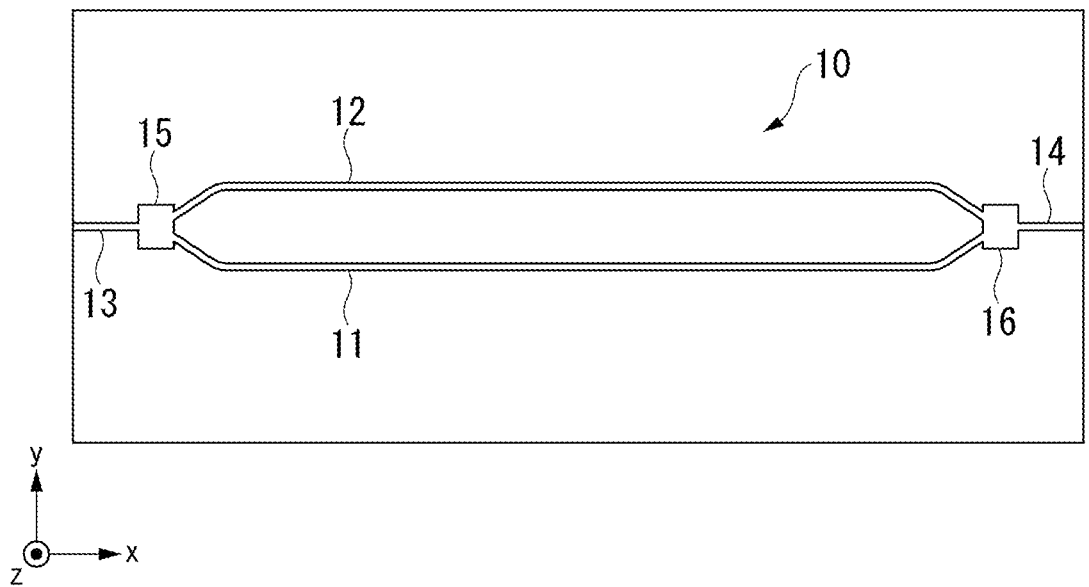
FIG. 2 is a plan view of an optical waveguide of an optical modulation element according to the first embodiment.
Figure 3:
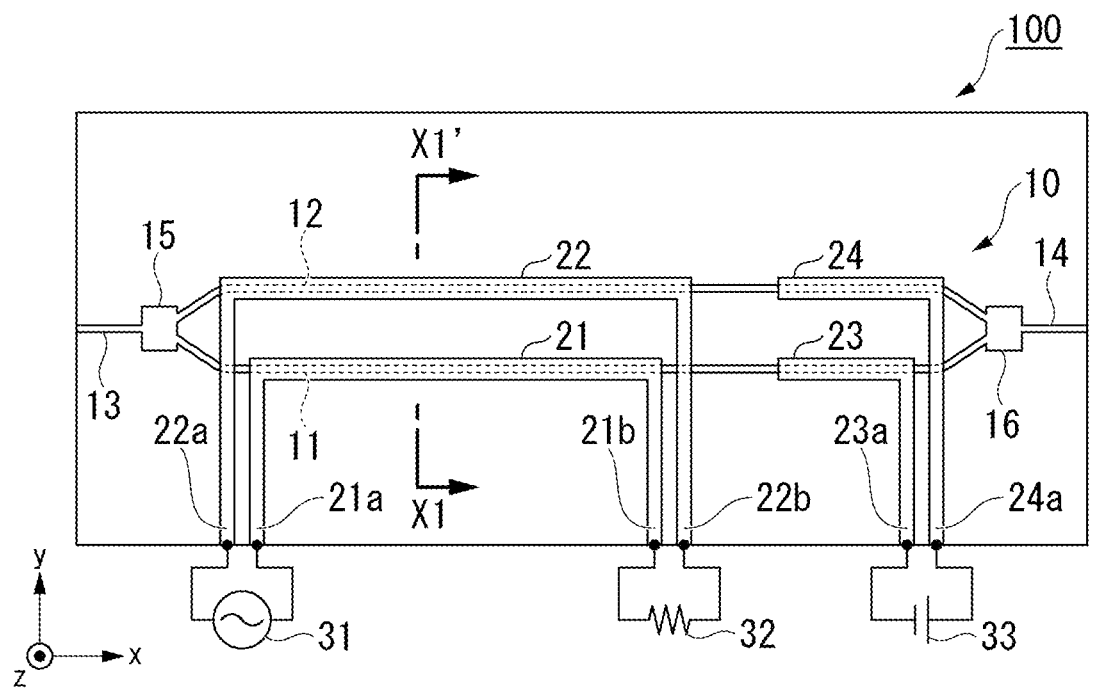
FIG. 3 is a plan view of the optical modulation element according to the first embodiment.
Figure 4:
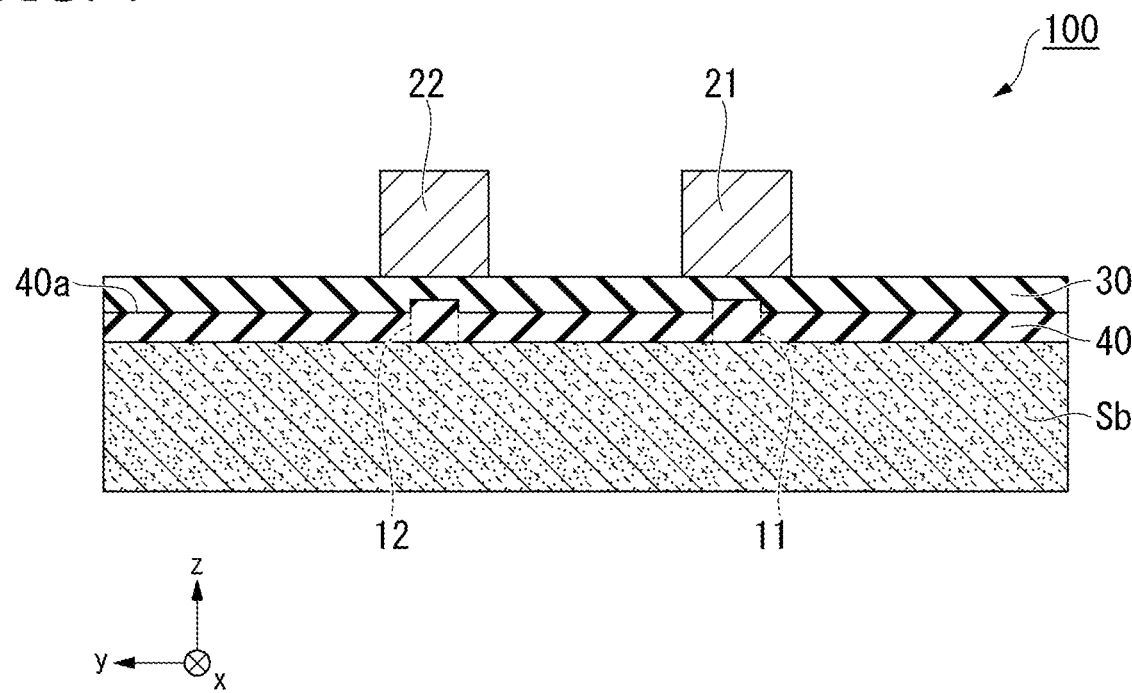
FIG. 4 is a cross-sectional view of the optical modulation element according to the first embodiment.

FIG. 2 is a plan view of an optical waveguide 10 of the optical modulation element 100 from the z direction. FIG. 3 is a plan view of the optical modulation element 100 from the z direction. FIG. 4 is a cross section taken along line X1-X1' in FIG. 3. The optical modulation element 100 includes the optical waveguide 10 and electrodes 21, 22, 23, and 24.

The optical modulation element 100 includes the substrate Sb. The substrate Sb may be any substrate on which an oxide film 40 such as a lithium niobate film can be formed as an epitaxial film, and a sapphire single crystal substrate or a silicon single crystal substrate is preferable. A crystal orientation of the substrate Sb is not particularly limited. Further, a lithium niobate film has a property of being easily formed as a c-axis-oriented epitaxial film with respect to the substrate Sb having various crystal orientations. Since crystals forming the c-axis-oriented lithium niobate film have three-fold symmetry, it is desirable that the underlying substrate Sb also have the same symmetry, a c-plane substrate is preferable in a case of a sapphire single crystal substrate, and a (111) plane substrate is preferable in a case of a silicon single crystal substrate.

The optical waveguide 10 is a light passage through which light propagates inside. The optical waveguide 10 includes, for example, the first optical waveguide 11, a second optical waveguide 12, an input path 13, an output path 14, a branch portion 15, and a coupling portion 16. The first optical waveguide 11 and the second optical waveguide 12 extend, for example, in the x direction. Lengths of the first optical waveguide 11 and the second optical waveguide 12 in the x direction are substantially the same. The branch portion 15 is between the input path 13, and the first optical waveguide 11 and the second optical waveguide 12. The input path 13 is connected to the first optical waveguide 11 and the second optical waveguide 12 via the branch portion 15. The coupling portion 16 is between the first optical waveguide 11 and the second optical waveguide 12, and the output path 14. The first optical waveguide 11 and the second optical waveguide 12 are connected to the output path 14 via the coupling portion 16.

The optical waveguide 10 includes the first optical waveguide 11 and the second optical waveguide 12 which are ridge-shaped portions protruding from a first surface 40a of the oxide film 40. The first surface 40a is an upper surface of the oxide film 40 other than the ridge-shaped portions. The ridge-shaped portions protrude in the z direction from the first surface 40a and extend along the optical waveguide 10. A shape of the X1-X1' cross section (cross section perpendicular to a traveling direction of light) of the ridge-shaped portion may be any shape as long as it can guide light, and may be, for example, a dome-shaped, a triangular, or a rectangular. A width of the ridge-shaped portion in the y direction is, for example, 0.3 µm or more and 5.0 µm or less, and a height of the ridge-shaped portion (protrusion height from the first surface 40a) is, for example, 0.1 µm or more and 1.0 µm or less.

The oxide film 40 is, for example, a c-axis-oriented lithium niobate film. The oxide film 40 is, for example, an epitaxial film epitaxially grown on the substrate Sb. An epitaxial film refers to a single crystal film whose crystal orientation is aligned by an underlying substrate. An epitaxial film is a film having a single crystal orientation in the z direction and an xy in-plane direction, and in which crystals are aligned in the x-axis, y-axis, and z-axis directions. Whether or not it is an epitaxial film can be proved, for example, by ascertaining a peak intensity and a pole at an orientation position in 2θ–θ X-ray diffraction. Also, the oxide film 40 may be a lithium niobate film provided on a Si substrate via $SiO_2$.

A composition of the lithium niobate is $Li_xNbA_yO_z$. A denotes an element other than Li, Nb, and O. x is 0.5 or more and 1.2 or less, and preferably 0.9 or more and 1.05 or less. y is 0 or more and 0.5 or less. z is 1.5 or more and 4.0 or less, and preferably 2.5 or more and 3.5 or less. An element for A may be, for example, K, Na, Rb, Cs, Be, Mg, Ca, Sr, Ba, Ti, Zr, Hf, V, Cr, Mo, W, Fe, Co, Ni, Zn, Sc, or Ce, or a combination of two or more types of these elements may be used.

The electrodes 21 and 22 are electrodes that apply the modulation voltage Vm to the optical waveguide 10. The electrode 21 is an example of a first electrode, and the electrode 22 is an example of a second electrode. A first end 21a of the electrode 21 is connected to a power supply 31, and a second end 21b thereof is connected to a terminating resistor 32. A first end 22a of the electrode 22 is connected to the power supply 31, and a second end 22b is connected to the terminating resistor 32. The power supply 31 is a part of the drive circuit 110 that applies the modulation voltage Vm to the optical modulation element 100.

The electrodes 23 and 24 are electrodes that apply the DC bias voltage Vdc to the optical waveguide 10. A first end 23a of the electrode 23 and a first end 24a of the electrode 24 are connected to a power supply 33. The power supply 33 is a part of the DC bias application circuit 120 that applies the DC bias voltage Vdc to the optical modulation element 100.

In FIG. 3, line widths of and a distance between the electrodes 21 and 22 disposed in parallel are made larger than they actually are for easy viewing. Therefore, a length of a portion in which the electrode 21 and the first optical waveguide 11 overlap and a length of a portion in which the electrode 22 and the second optical waveguide 12 overlap appear to be different, but these lengths are substantially the same. Similarly, a length of a portion in which the electrode 23 and the first optical waveguide 11 overlap and a length of a portion in which the electrode 24 and the second optical waveguide 12 overlap are substantially the same.

Also, when the DC bias voltage Vdc is additionally applied to the electrodes 21 and 22, the electrodes 23 and 24 may not be provided. Also, ground electrodes may be provided around the electrodes 21, 22, 23, and 24.

The electrodes 21, 22, 23, and 24 are above the oxide film 40 with the buffer layer 30 interposed therebetween. The electrodes 21 and 23 each can apply an electric field to the first optical waveguide 11. The electrodes 21 and 23 are positioned at positions at which, for example, they each overlap the first optical waveguide 11 in a plan view from the z direction. The electrodes 21 and 23 are each above the first optical waveguide 11. The electrodes 22 and 24 each can apply an electric field to the second optical waveguide 12. The electrodes 22 and 24 are positioned at positions at which they each overlap the second optical waveguide 12 in a plan view from the z direction. The electrodes 22 and 24 are each above the second optical waveguide 12.

The buffer layer 30 is between the optical waveguide 10 and an electrode 20. The buffer layer 30 covers and protects the ridge-shaped portion. Also, the buffer layer 30 prevents light propagating through the optical waveguide 10 from being absorbed by the electrode 20. The buffer layer 30 has a lower refractive index than the oxide film 40. The buffer layer 30 is made of, for example, $SiO_2$, $Al_2O_3$, $MgF_2$, $La_2O_3$, ZnO, $HfO_2$, MgO, $Y_2O_3$, $CaF_2$, $In_2O_3$, or the like, or a mixture thereof.

The optical modulation element 100 can be manufactured by a known method. The optical modulation element 100 is manufactured using semiconductor processes such as, for example, epitaxial growth, photolithography, etching, vapor phase epitaxy, and metallization.

The optical modulation element 100 converts an electrical signal into an optical signal. The optical modulation element 100 modulates the input light $L_{in}$ into the output light $L_{out}$. First, a modulation operation of the optical modulation element 100 will be described.

The input light $L_{in}$ input from the input path 13 branches to the first optical waveguide 11 and the second optical waveguide 12 and propagates. A phase difference between light propagating through the first optical waveguide 11 and light propagating through the second optical waveguide 12 is zero at the time of branching.

Next, an applied voltage is applied between the electrode 21 and the electrode 22. For example, differential signals that have the same absolute value, have opposite polarities, and are not out of phase with each other may be applied to the electrode 21 and the electrode 22. Refractive indexes of the first optical waveguide 11 and the second optical waveguide 12 change due to an electro-optical effect. For example, the refractive index of the first optical waveguide 11 changes by $+\Delta n$ from a reference refractive index n, and the refractive index of the second optical waveguide 12 changes by $-\Delta n$ from the reference refractive index n.

A difference in refractive index between the first optical waveguide 11 and the second optical waveguide 12 generates the phase difference between the light propagating through the first optical waveguide 11 and the light propagating through the second optical waveguide 12. The light propagating through the first optical waveguide 11 and the second optical waveguide 12 is combined in the output path 14 and is output as the output light $L_{out}$. The output light $L_{out}$ is superposition of the light propagating in the first optical waveguide 11 and the light propagating in the second optical waveguide 12. An intensity of the output light $L_{out}$ changes according to the phase difference between the light propagating in the first optical waveguide 11 and the light propagating in the second optical waveguide 12. For example, when the phase difference is an even multiple of $\pi$, the light intensifies each other, and when the phase difference is an odd multiple of $\pi$, the light weakens each other. With such a procedure, the optical modulation element 100 modulates the input light $L_{in}$ into the output light $L_{out}$ according to the electrical signal.

The modulation voltage Vm according to the modulation signal is applied to the electrodes 21 and 22 which are for applying a modulation voltage to the optical modulation element 100. The voltage applied to the electrodes 23 and 24 which are for applying a DC bias voltage, that is, the DC bias voltage Vdc output from the DC bias application circuit 120 is controlled by the DC bias control circuit 130. The DC bias control circuit 130 adjusts the operating point Vd of the optical modulation element 100 by controlling the DC bias voltage Vdc. The operating point Vd refers to a voltage that is a center of a modulation voltage amplitude.

The DC bias control circuit 130 is configured to set the operating point Vd of the optical modulation element 100 within a voltage width R1. The voltage width R1 is defined by a half-wave voltage $V\pi$ and a null point voltage Vn.

Figure 5:
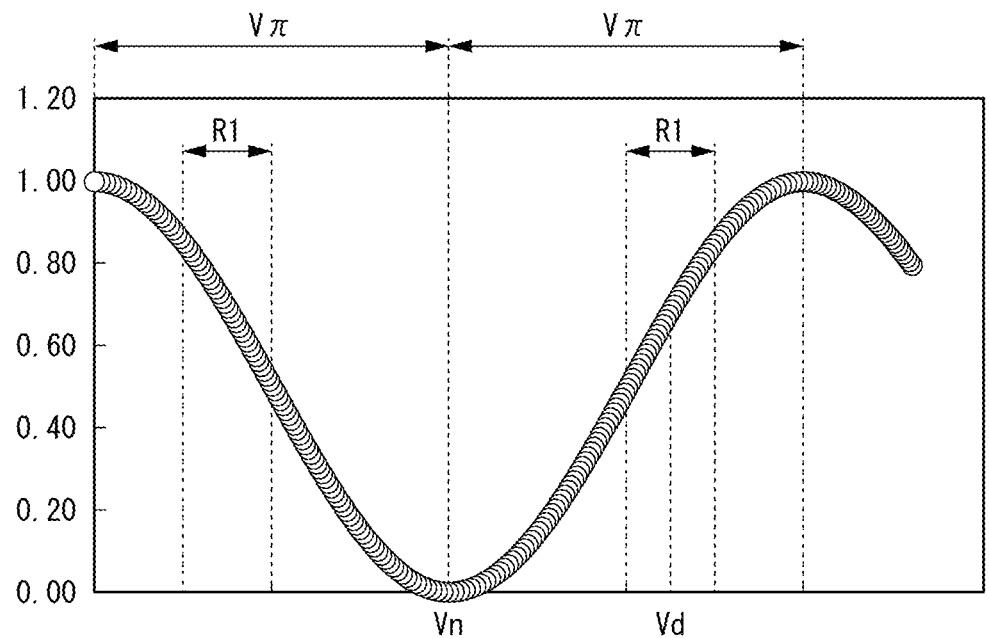
FIG. 5 is a diagram showing a relationship between an applied voltage and an output of the optical modulator according to the first embodiment.

An optical modulation due to the optical modulation element 100 will be described with reference to FIG. 5. FIG. 5 is a diagram showing a relationship between an applied voltage and an output of the optical modulator 200 according to the first embodiment. The horizontal axis of FIG. 5 represents a voltage applied to the optical modulation element 100, and the vertical axis represents one in which an output from the optical modulation element 100 is standardized. The output is standardized as "1" when the phase difference between the light propagating through the first optical waveguide 11 and the light propagating through the second optical waveguide 12 is zero.

Next, the null point voltage Vn and the half-wave voltage Vπ will be described.

An output of the optical modulation element 100 is maximum when the applied voltage is zero. This is because when the applied voltage is zero, the phase difference between the light propagating through the first optical waveguide 11 and the light propagating through the second optical waveguide 12 is zero.

The output from the optical modulation element 100 gradually decreases as the applied voltage increases, and is minimized at a certain point. A voltage at which the output from the optical modulation element 100 is minimized is the null point voltage Vn. The null point voltage Vn can be ascertained by measuring a voltage when a light output from the optical modulation element 100 is minimized. Specifically, the null point voltage Vn can be ascertained by applying a voltage to the electrodes 21 and 22 used for applying a modulation voltage and measuring a voltage (potential difference between the electrodes 21 and 22) when the light output from the optical modulation element 100 is minimized.

The half-wave voltage (half-wave phase modulation voltage) is a voltage for making a phase difference of light 180° in a Mach-Zehnder type optical modulator, and a voltage width in which the light output from the optical modulation element 100 reaches the minimum from the maximum corresponds to the half-wave voltage Vπ. When a voltage exceeding the null point voltage Vn is applied, the output from the optical modulation element 100 changes periodically. The output from the optical modulation element 100 repeats the maximum and the minimum alternately for each half-wave voltage Vπ. The half-wave voltage Vπ can be ascertained by measuring a voltage at which the light output from the optical modulation element 100 is minimized and a voltage at which the light is maximized. Specifically, the half-wave voltage Vπ can be ascertained by applying a voltage to the electrodes 21 and 22 used for applying a modulation voltage and measuring a voltage (potential difference between the electrodes 21 and 22) at which the light output from the optical modulation element 100 is maximized and a voltage (potential difference between the electrodes 21 and 22) at which the light is minimized.

The half-wave voltage Vπ of the optical modulation element 100 changes according to a configuration of the optical modulation element 100. The half-wave voltage Vπ changes according to, for example, a length of the electrode 21 on the first optical waveguide 11, a length of the electrode 22 on the second optical waveguide 12, and the like. The length refers to a length in a propagation direction of light. In a case of the optical modulation element 100 of FIG. 3, the length refers to a length of a portion of the electrode 21 that overlaps the first optical waveguide 11 or a length of a portion of the electrode 22 that overlaps the second optical waveguide 12. The length is called an interaction length. When the interaction length becomes large, the half-wave voltage Vπ reduces, and when the interaction length becomes small, the half-wave voltage Vπ increases.

Since the optical modulation element using a lithium niobate thin film can efficiently apply an electric field to the optical waveguide compared to an optical modulation element using bulk lithium niobate, the half-wave voltage Vπ can be reduced. However, in order to be incorporated into a transceiver for a data center, the optical modulation element 100 needs to be further miniaturized, and the interaction length of the optical modulation element 100 needs to be made small. Also, in order to extend a modulation frequency band of the optical modulation element 100, the interaction length needs to be made small. Therefore, the half-wave voltage Vπ of the optical modulation element 100 becomes, for example, as large as 4.9 V or more. Therefore, the optical modulator 200 according to the present embodiment is configured to set the operating point Vd within the voltage width R1 and controls an applied voltage width Vpp to be described later.

The voltage width R1 is in a range of Vn+0.50Vπ or more and Vn+0.75Vπ or less, or Vn−0.75Vπ or more and Vn−0.50Vπ or less. That is, the operating point Vd is designed to satisfy the following relational expression.

$$Vn+0.50V\pi \leq Vd \leq Vn+0.75V\pi \text{ or } Vn-0.75V\pi \leq Vd \leq Vn-0.50V\pi$$

The operating point Vd may fluctuate due to a temperature of a usage environment or the like. If the operating point Vd fluctuates during use, it is corrected by the DC bias control circuit 130. The DC bias control circuit 130 corrects a fluctuation of the operating point Vd based on, for example, branched light $L_b$ branched off from the output light $L_{out}$.

The drive circuit 110 controls the applied voltage width Vpp applied to the optical modulation element 100. The drive circuit 110 controls a high-frequency voltage applied to the optical modulation element 100. The drive circuit 110 inputs an electrical signal converted into an optical signal to the optical modulation element 100. The drive circuit 110 includes, for example, a power supply, a driver, and the like.

Figure 6:
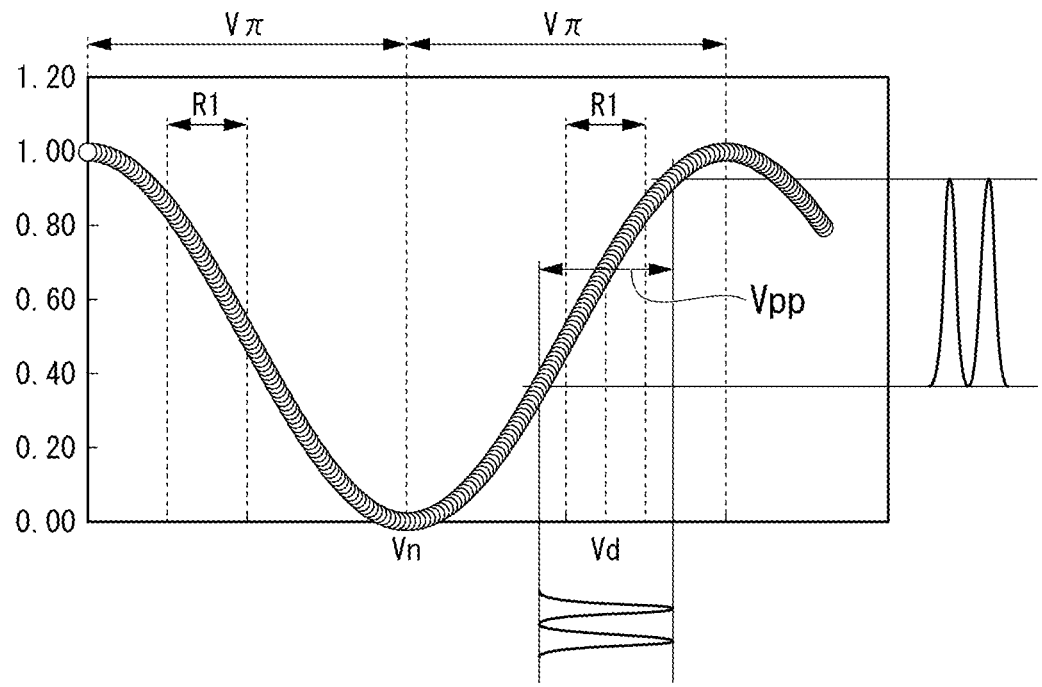
FIG. 6 is a diagram for explaining an applied voltage width of the optical modulator according to the first embodiment.

FIG. 6 is a diagram for explaining the applied voltage width Vpp of the optical modulator 200 according to the first embodiment. FIG. 6 is a diagram in which a description of the applied voltage width Vpp is added to FIG. 5.

The applied voltage width Vpp refers to a range of a voltage utilized when the optical modulation element 100 is operated. A voltage in a range of a predetermined voltage width with the operating point Vd as a center is applied to the optical modulation element 100. A high-frequency voltage, whose difference between a maximum value and a minimum value is the applied voltage width Vpp with the operating point Vd as a center, is applied to the optical modulation element 100. The output from the optical modulation element 100 changes in a range corresponding to the applied voltage width Vpp.

For example, when the operating point Vd is Vn+0.5π and the applied voltage width Vpp is a half-wave voltage Vπ, a voltage in a range of Vn to Vn+Vπ is applied to the optical modulation element 100. The output from the optical modulation element 100 is minimum when an applied voltage is Vn and is maximum when the applied voltage is Vn+Vπ. That is, when the applied voltage width Vpp is set in the above-described range, a change width of the output of the optical modulation element 100 becomes a maximum. On the other hand, a drive voltage required to drive the optical modulation element 100 increases.

The drive circuit 110 is configured to set the applied voltage width Vpp applied to the optical modulation element 100 in a range of 0.22Vπ≤Vpp≤0.50Vπ.

The applied voltage width Vpp can be ascertained by measuring a minimum voltage (potential difference between the electrodes 21 and 22) and a maximum voltage (potential difference between the electrodes 21 and 22) applied to the electrodes 21 and 22 used for applying a modulation voltage.

Figure 7:
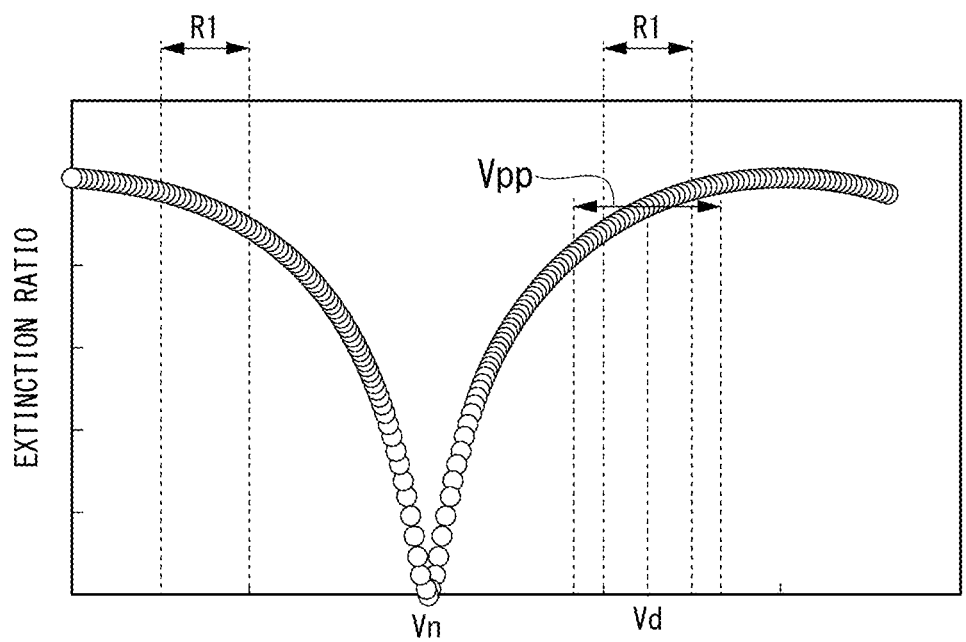
FIG. 7 is a diagram showing a relationship between an applied voltage and an extinction ratio of the optical modulator according to the first embodiment.

FIG. 7 is a diagram showing a relationship between an applied voltage and an extinction ratio of the optical modulator 200 according to the first embodiment. The horizontal axis of FIG. 7 represents a voltage applied to the optical modulation element 100, and the vertical axis represents a ratio of the output light $L_{out}$ at an applied voltage and the output light $L_{out}$ at a null point voltage. The extinction ratio is a ratio of a maximum value and a minimum value of the output light $L_{out}$.

As shown in FIGS. 5 and 7, when the operating point Vd is set within the voltage width R1 and the applied voltage width Vpp is set within a predetermined range, the optical modulation element 100 operates in a region in which an amount of light of the output light $L_{out}$ is relatively large.

If the optical modulation element 100 is driven in a region (region in the vicinity of the null point voltage Vn) in which the amount of light of the output light $L_{out}$ is relatively small, a modulation loss in the optical modulation element 100 may increase, and the output light $L_{out}$ may not be sufficiently detected. That is, there is a likelihood that a signal component is buried in noise and cannot be detected.

On the other hand, if the optical modulation element 100 is driven in a region in which the amount of light of the output light $L_{out}$ of the optical modulation element 100 is sufficiently large, sufficient sensitivity can be obtained. For example, if the operating point Vd is set within the voltage width R1 and the applied voltage width Vpp is set within a predetermined range, the optical modulation element 100 can be used in a range in which a modulation loss is 3 dB or less.

Here, as shown in FIG. 7, an extinction ratio is small in a region in which the amount of light of the output light $L_{out}$ of the optical modulation element 100 is sufficiently large. For example, under the condition that the applied voltage width Vpp is the same, when the operating point Vd is set at a position away from the null point voltage Vn, an amount of light increases compared to a case in which the operating point Vd is set in the vicinity of the null point voltage Vn, but an extinction ratio decreases. However, an extinction ratio required for an optical modulator for a data center is smaller than that for an optical modulator for long-distance communication, and is about 3 dB to 9 dB. Therefore, if the operating point Vd is set within the voltage width R1 and the applied voltage width Vpp is set within a predetermined range, the optical modulator can have the extinction ratio of 3 dB or more and can be used for a data center.

Also, in the optical modulation element 100 using a lithium niobate film, the drive voltage increases when an attempt is made to maximize the extinction ratio, but when the applied voltage width Vpp is set within a predetermined range, the optical modulator 200 can be driven at a low voltage.

As described above, the optical modulator 200 according to the first embodiment can be driven at a low voltage and has little modulation loss.

As described above, the optical modulator 200 according to the first embodiment has been described as an example, but the present disclosure is not limited to the first embodiment, and various modifications can be made.

For example, the operating point Vd may be set in a range of $Vn+0.62V\pi \leq Vd \leq Vn+0.75V\pi$ or $Vn-0.75V\pi \leq Vd \leq Vn-0.62V\pi$, and the applied voltage width Vpp may be set in a range of $0.32V\pi \leq Vpp \leq 0.50V\pi$. In this case, a modulation loss of the optical modulation element 100 can be made 2 dB or less.

Also, for example, the operating point Vd may be set in a range of $Vn+0.62V\pi \leq Vd \leq Vn+0.73V\pi$ or $Vn-0.73V\pi \leq Vd \leq Vn-0.62V\pi$, and the applied voltage width Vpp may be set in a range of $0.32V\pi \leq Vpp \leq 0.50V\pi$. At a position at which the output of the output light $L_{out}$ is maximum, distortion is likely to occur in the signal. Waveform distortion of a reproduced signal can be suppressed by avoiding a region in which the distortion is likely to occur.

Figure 8:
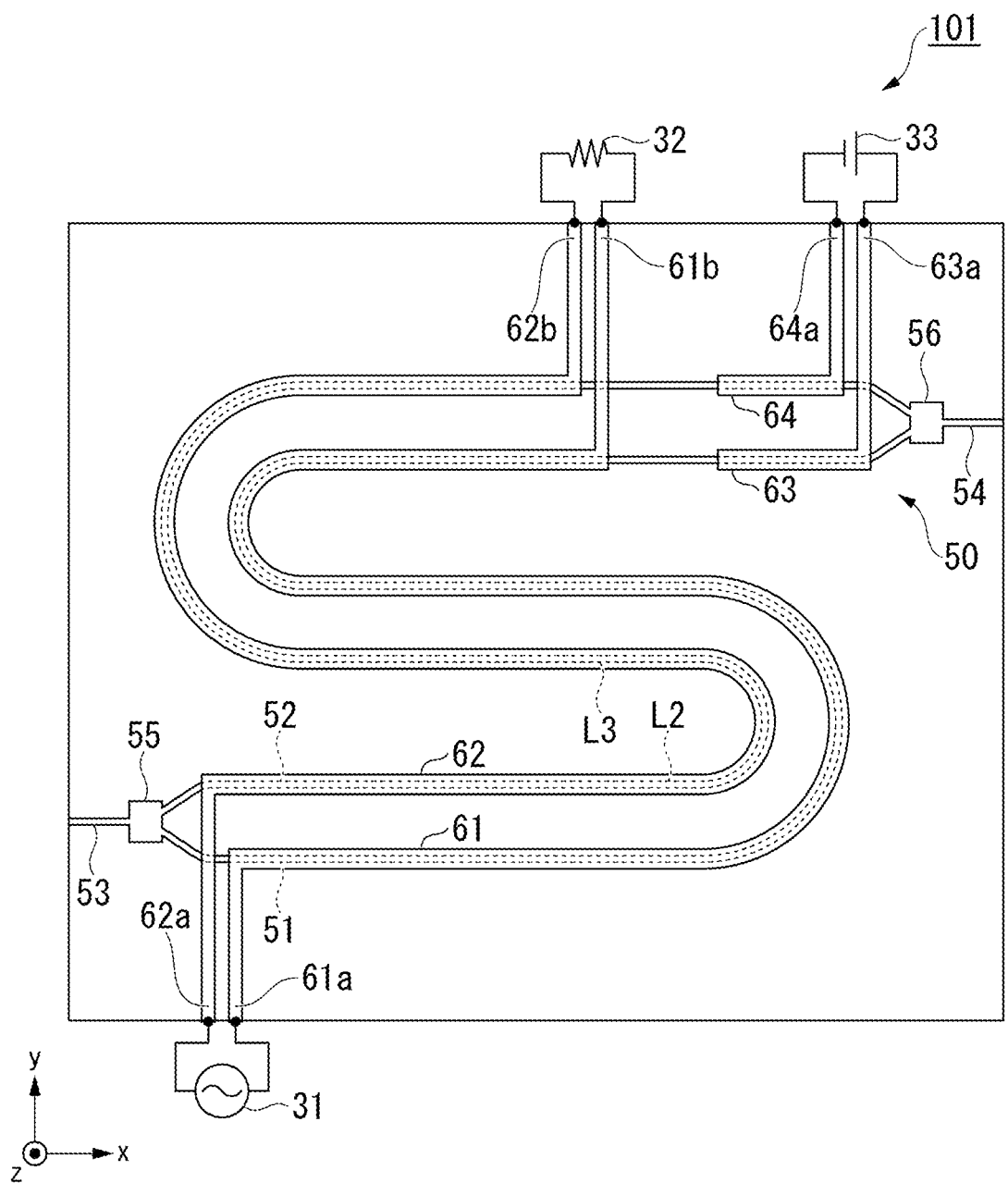
FIG. 8 is a plan view of an optical modulation element according to a first modified example.

Also, FIG. 8 is a plan view of an optical modulation element 101 according to a first modified example from the z direction. The optical modulation element 101 includes an optical waveguide 50 and electrodes 61, 62, 63, and 64.

The optical waveguide 50 includes a first optical waveguide 51, a second optical waveguide 52, an input path 53, an output path 54, a branch portion 55, and a coupling portion 56. The optical waveguide 50 is different from the optical waveguide 10 in that the first optical waveguide 51 and the second optical waveguide 52 are curved in the middle. Other points of the optical waveguide 50 are the same as those of the optical waveguide 10.

The electrodes 61 and 62 are electrodes that apply the modulation voltage Vm to the optical waveguide 50. The electrode 61 is an example of a first electrode, and the electrode 62 is an example of a second electrode. A first end 61a of the electrode 61 is connected to the power supply 31, and a second end 61b is connected to the terminating resistor 32. A first end 62a of the electrode 62 is connected to the power supply 31, and a second end 62b is connected to the terminating resistor 32. The electrodes 63 and 64 are electrodes that apply the DC bias voltage Vdc to the optical waveguide 50. A first end 63a of the electrode 63 and a first end 64a of the electrode 64 are connected to the power supply 33.

In FIG. 8, since line widths of and a distance between the electrodes 61 and 62 disposed in parallel are made larger, a length of a portion in which the electrode 61 and the first optical waveguide 51 overlap and a length of a portion in which the electrode 62 and the second optical waveguide 52 overlap are shown to be different, but these lengths are substantially the same. Similarly, a length of a portion in which the electrode 63 and the first optical waveguide 51 overlap and a length of a portion in which the electrode 64 and the second optical waveguide 52 overlap are substantially the same.

The electrode 61 and the electrode 62 are different from the electrode 21 and the electrode 22 in that they are curved along the first optical waveguide 51 and the second optical waveguide 52. The other points of the electrodes 61, 62, 63, and 64 are the same as those of the electrodes 21, 22, 23, and 24.

The optical modulation element 101 has a small element size in the x direction because the first optical waveguide 51 and the second optical waveguide 52 are curved. The optical modulation element 101 can realize an element size of, for example, 100 mm$^2$ or less and preferably 50 mm$^2$ or less. An optical modulator for a data center is required to be miniaturized. When the optical waveguide 50 is bent, the optical modulation element 101 can be housed in region of a small size corresponding to an existing optical modulator for a data center.

REFERENCE SIGNS LIST 10, 50 Optical waveguide
11, 51 First optical waveguide
12, 52 Second optical waveguide
13, 53 Input path
14, 54 Output path
15 Branch portion
16 Coupling portion
21, 22, 23, 24, 61, 62, 63, 64 Electrode 30 Buffer layer
40 Oxide film
40a First surface
100, 101 Optical modulation element
110 Drive circuit
120 DC bias application circuit
130 DC bias control circuit
200 Optical modulator
$L_{in}$ Input light
$L_{out}$ Output light
$L_b$ Branched light
Vd Operating point
Vn Null point voltage
Vπ Half-wave voltage
Vpp Applied voltage width

What is claimed is:

1. An optical modulator comprising:
an optical modulation element including a first optical waveguide, a second optical waveguide, a first electrode and a third electrode that apply electric fields to different portions of the first optical waveguide, and a second electrode and a fourth electrode that apply electric fields to different portions of the second optical waveguide; and
a control unit configured to control an applied voltage between the first electrode, the second electrode, the third electrode and the fourth electrode, wherein
a length of a portion in which the first electrode and the first optical waveguide overlap and a length of a portion in which the second electrode and the second optical waveguide overlap are substantially the same,
a length of a portion in which the third electrode and the first optical waveguide overlap and a length of a portion in which the fourth electrode and the second optical waveguide overlap are substantially the same, and
when a half-wave voltage of the optical modulation element is Vπ and a null point voltage of the optical modulation element is Vn, the control unit sets an operating point Vd in a range of Vn+0.50Vπ≤Vd≤Vn+0.75Vπ or Vn−0.75Vπ≤Vd≤Vn−0.50Vπ and sets an applied voltage width Vpp, which is an amplitude of an applied voltage applied to the optical modulation element, in a range of 0.22Vπ≤Vpp≤0.50Vπ.

2. The optical modulator according to claim 1, wherein the first optical waveguide and the second optical waveguide each include a ridge-shaped portion protruding from a first surface of a lithium niobate film.

3. A driving method of an optical modulation element including a first optical waveguide, a second optical waveguide, a first electrode and a third electrode that are at positions overlapping different portions of the first optical waveguide in a plan view, and a second electrode and a fourth electrode that are at positions overlapping different portions of the second optical waveguide in a plan view, a length of a portion in which the first electrode and the first optical waveguide overlap and a length of a portion in which the second electrode and the second optical waveguide overlap being substantially the same, a length of a portion in which the third electrode and the first optical waveguide overlap and a length of a portion in which the fourth electrode and the second optical waveguide overlap being substantially the same, the driving method comprising:
controlling the first electrode, the second electrode, the third electrode and the fourth electrode, and setting an operating point Vd in a range of Vn+0.50Vπ≤Vd≤Vn+0.75Vπ or Vn−0.75Vπ≤Vd≤Vn−0.50Vπ, when a half-wave voltage of the optical modulation element is Vπ and a null point voltage of the optical modulation element is Vn; and
setting an applied voltage width Vpp, which is an amplitude of an applied voltage applied to the optical modulation element, in a range of 0.22Vπ≤Vpp≤0.50Vπ.

4. The driving method of an optical modulation element according to claim 3, wherein the first optical waveguide and the second optical waveguide each include a ridge-shaped portion protruding from a first surface of a lithium niobate film.

* * * * *